United States Patent [19]

D'Haeyer

[11] 4,219,051

[45] Aug. 26, 1980

[54] HEAT RECOVERABLE ARTICLE

[75] Inventor: André H. L. D'Haeyer, Kessel-lo, Belgium

[73] Assignee: N.V. Raychem S.A., Kessel-lo, Belgium

[21] Appl. No.: 711,075

[22] Filed: Aug. 2, 1976

[30] Foreign Application Priority Data

Aug. 4, 1975 [GB] United Kingdom ............... 32448/75

[51] Int. Cl.² ........................ F16L 9/12; F16L 57/00
[52] U.S. Cl. .................................. 138/178; 138/110; 156/218; 428/913
[58] Field of Search ................. 29/447; 138/156, 161, 138/162, 163, 164, 166, 99, 158, 110, 178; 156/217, 218; 174/DIG. 8; 264/230; 285/DIG. 10, 381; 428/913

[56] References Cited

U.S. PATENT DOCUMENTS

| 2,068,022 | 1/1937 | Hammel | 138/156 X |
| 3,455,336 | 7/1969 | Ellis | 138/158 X |
| 3,770,556 | 11/1973 | Evans et al. | 138/99 X |
| 3,847,721 | 11/1974 | Evans | 138/156 X |

Primary Examiner—Frederick R. Schmidt
Attorney, Agent, or Firm—Lyon & Lyon

[57] ABSTRACT

A heat recoverable warp-around closure member comprises a sheet having a pair of elongate parallel spaced-apart profiles that may be interlocked, optionally with internal or external support or fastening means associated with the profiles, when the sheet is wrapped up to form a hollow member. The member may then be heated, the interlocked profiles maintaining their relative positions against the recovery forces.

25 Claims, 3 Drawing Figures

HEAT RECOVERABLE ARTICLE

This invention relates to a closure article, especially a heat recoverable wrap-around closure article having a fastening means, and a sheet for forming such an article.

Heat-recoverable wrap-around closure articles have found wide application in the protection of pipe lines and electrical cables. The problem most frequently encountered with wrap-around articles is the provision of a fastening means capable of withstanding the forces associated with recovery of the sleeve. Various articles have solved this problem satisfactorily to some extent.

A wrap-around closure article is disclosed in U.S. Pat. No. 3,455,336 granted July, 15, 1969 to Roger H. Ellis. This article comprises a tubular heat-recoverable member having an integral ridge on its outer surface, the ridge being split longitudinally to provide two facing portions. The tubular member may be wrapped around a substrate and the facing portions of the ridge held together by a fastening means which may be, for example, a strip of material of generally C-shaped section. The fastening means may be slid along the facing portions so that when in place it tends to prevent their parting during and after the heat recovery of the tubular member. This article has found wide application, for example, in the pipe-line industry and has been well accepted. It does however require careful manufacture as the fastening means must be the correct size to fit the facing portions of the ridge.

Another wrap-around closure article is described in U.S. Pat. No. 3,379,218 granted Apr. 23, 1968 to Julian S. Conde. In one embodiment, the Conde article utilizes the button and button-hole closure method whereby one edge of a heat-recoverable sheet is provided with a row of buttons and a second edge is provided with holes, each of which is capable of retaining a button upon heat recovery of the sheet. This article has also been found to be useful as a closure sleeve but it is preferably manufactured by moulding which requires the expense of cutting a mould for each size of sleeve.

Another wrap-around closure article is that described and claimed in the U.S. Pat. No. 3,574,313, granted Apr. 13, 1971 to Ken Tanaka, which describes in one embodiment a sleeve having a first edge which is provided with folded tabs and a second edge provided with slots capable of receiving the tabs and capable of retaining the sleeve in a closed tubular configuration. This sleeve also provides a satisfactory closure article but its installation requires the threading of the tabs into the slots prior to the application of heat.

Yet another wrap-around closure article is that described and claimed in U.S. Pat. No. 3,350,898 granted Sept. 28, 1970 to John Robert Wilson. The Wilson article comprises a heat-shrinkable sheet having a pair of opposite edges each provided with a row of apertures, the apertures in one row staggered relative to the loops in the other, such that upon folding the sheet along each row of apertures, there results a plurality of loops which are capable of receiving a connecting member. This closure article also provides a satisfactory closure sleeve but it requires a separate fastening member to hold the edges together.

Another wrap-around article is that described and claimed in U.S. Pat. No. 3,542,077, granted Nov. 24, 1970 to Richard W. Muchmore. It comprises a differentially crosslinked polymeric sheet having an insert in an interconnecting means provided at each of two opposite edges of the sheet, the insert being substantially unaffected by the heat required to recover the sheet, and the interconnecting means being engagingly co-operable. This article satisfactorily eliminates the need for an external sealing member but its manufacture involves the step of embedding two inserts in each of the interconnecting means.

Another wrap-around article is that disclosed in Raychem Limited British Pat. No. 1,219,768, published Jan. 20, 1971. This article has a pair of opposite edges each provided with interlocking openings held in an interconnecting position by a fastening member passed therethrough. This sleeve like the Wilson sleeve requires a separate fastening member for closure.

Yet another closure article is that disclosed in DOS No. 2 600 647 published on Sept. 2, 1976 in the name of N. V. Raychem S.A. the inventors being Antony C. Evans and André Hector Leon D'Haeyer. The article therein described is similar to that in U.S. Pat. No. 3,455,336 (Ellis) in that it comprises a heat-recoverable sheet the opposite edges of which are each provided with a longitudinal protuberance. A heat-recoverable fastening means capable of being located about the protuberances when these are placed in abutment is provided. The fastening means may be satisfactorily heat recovered to retain the protuberances in abutment thus effecting closure of the wrap-around article. The article, however, requires the provision of a pair of protuberances which are most effectively manufactured by moulding.

Clearly, a considerable length of time has been spent on the invention and development of heat-recoverable closure articles. Although each solution satisfies certain requirements, no completely satisfactory sleeve has yet been developed. Certain sleeves are expensive because either their manufacture is complicated, involving several processes, or the members constituting the closure article must be made to close tolerances.

The present invention provides a preferably polymeric closure article which may be manufactured by extrusion and subsequently formed into a heat-recoverable wrap-around article by a simple and inexpensive technique. The present invention also provides a heat-recoverable wrap-around closure sleeve made from a heat recoverable sheet coated with a sealant or adhesive, for example, a mastic or a hot melt material.

The present invention accordingly provides a closure means which comprises a heat recoverable sheet having extending in a direction transverse to a direction of recovery first and second elongate profiles projecting from the plane of the sheet, the profiles being spaced apart in the direction of recovery and being interlockable with the second profile overlying the first, whereby the sheet may be formed into a hollow article capable of changing cross-section upon recovery, said profiles being maintained in interlocking relationship during recovery. The present invention preferably provides a closure means which comprises such a sheet, and in which the first profile has a portion more remote from the plane of the sheet that has a wider cross-section than that of a portion closer to the plane of the sheet, and the second profile has a portion of surface that is interlockable with a portion of the outer, projecting surface of the first profile. Preferably, the profiles are maintained in interlocking relationship upon recovery of the sheet by means comprising either an internal support means for the first profile, a fastening device that surrounds at least a portion of the second profile, or, most preferably, both.

Advantageously, the second profile has a concave surface that snaps over a convex surface of the first profile, the two surfaces preferably being congruent or capable of being made congruent. The reduction in width of cross-section of the first profile with proximity to the plane of the sheet assists in preventing the second profile from being pulled off the first, for example under the recovery stress. At least the second profile, regardless of its cross-section, is preferably resilient and flexible, whereby it may be "snapped" over the first.

Preferably, the cross-section of each profile together with the adjacent portions of the sheet forms an omega ($\Omega$). The present invention also provides a method of making a closure article which comprises deforming a sheet at each of at least two positions transverse to one principal longitudinal axis of the sheet into a profile, the sheet, at least subsequent to the process of deformation, having the property of dimensional heat instability.

A heat-recoverable article is especially one which has been deformed from a dimensionally heat stable configuration to a dimensionally heat unstable configuration and retains its heat unstable configuration below a certain temperature or temperature range, the article being capable of recovering by returning to or towards its original configuration when allowed to undergo a rise in temperature above that certain temperature or temperature range. In the case of the sheet of the present invention, the recovery preferably takes the form of a change in one dimension, e.g., the width of the sheet, and thus, when the profiles are in engagement to form a hollow article, results in a reduction in the cross-section of the interior of the article. Preferably, the sheet may be closed to form a tube which shrinks in diameter.

Any material which is capable of being rendered heat-recoverable is suitable for the manufacture of the sheet. Plastics materials which are capable of being rendered heat-recoverable include, for example, thermoplastics which have been crosslinked by irradiation with $\beta$- or $\gamma$ rays or by chemical means or by a combination thereof. Materials may be rendered heat-recoverable, for example, by the methods described in U.S. Pat. No. 2,027,962 granted Jan. 14, 1936 to Lauchlin M. Currie, U.S. Pat. No. 3,086,242 granted Apr. 23, 1963 to Paul M. Cook et al and in U.S. Pat. No. 3,597,372 granted Aug. 3, 1971 to Paul M. Cook. Materials suitable to be rendered heat recoverable are also disclosed therein, the disclosures of such materials and methods disclosed therein are incorporated herein by reference. Plastics of special interest which are capable of being rendered heat recoverable include polyolefins, especially polyethylene, copolymers of ethylene and vinyl acetate, ethylene and ethyl acrylate, halopolymers, especially polyvinyl chloride, polyvinylidene fluoride and polymers incorporating units derived from hexafluoroethylene, and chlorotrifluoroethylene.

The sheet of the present invention is preferably of a plastics material, for example polyethylene, that has been extruded as a tube and crosslinked by irradiation. The tube may be cut into lengths and rendered heat-shrinkable by expansion of its cross-section in either order. The resulting heat-shrinkable tube is cut longitudinally to provide a dimensionally heat-unstable sheet two opposite edges of which may be placed in a heated mould and provided, under vacuum, with a profile which preferably runs along the length of the sheet parallel to an edge thereof.

Alternatively, the sheet may be manufactured by any of several other methods. For example, a tube may be formed, cross-linked if necessary, and provided with a pair of generally parallel profiles before expansion and/or cutting into a sheet. The sheet may be made in one step if preferred by moulding it with the profile and cross-linking it in the mould, the cutting process being eliminated and the expansion step being carried out later. It is to be understood that so long as the sheet is heat-recoverable and is provided with at least a pair of inter-connectable profiles each of which is generally parallel to an adjacent sheet edge and transverse to the direction of recovery of the sheet, any manufacturing technique and sequence may be used. It will be appreciated that the sheet need not be formed in a strictly planar configuration, and references herein to projections from the plane of the sheet include projections from the plane occupied by the article in sheet form in a flat state, even if such a flat state may only theoretically be achieved. This may be the case where the sheet has been moulded or cut from tube stock.

One or two strips or material may be attached to the heat-recoverable sheet, the, or each, strip being provided with a profile running throughout the longer dimension thereof. Preferably the, or each, strip is adjacent to, or at, one or each of an opposite edge of the sheet. The, or each, strip is preferably dimensionally stable and may be composed of any plastic or metallic material which is suitable to be provided with a profile.

The cross-sectional configuration of the profile is in the preferred embodiment similar to that of the upper case Greek letter omega, but it is to be herein understood that this configuration may be described as a C-shaped, semi-circular, oval or rectangular section, provided that one portion of the profile remote from the plane of the sheet is wider than a portion closer to the plane of the sheet. There must be at least two such profiles substantially parallel so that the first profile may be brought into contact with the second profile but these need not be of the same cross-sectional configuration, although this is preferred, so long as they are retainably interconnectable. There may be more than two profiles for interconnection, for example, three profiles for triple interconnection, or there may be more than one pair of profiles, each member of which is inter-connectable with its partner.

Where there are three profiles for triple interconnection, a first of which is adjacent to a first edge of the sheet, a second of which is adjacent to a second edge opposite to the first edge, and a third member of which is located parallel to the first and second profiles on, for example, a line about half the sheet length from the first profile, the profiles are preferably of different cross-sectional area to enhance ease of triple interconnection and retention.

It will be understood that a sheet provided in its dimensionally stable condition with a pair of profiles each of which is parallel to each of a pair of opposite sheet edges may be expanded so that the profiles are no longer parallel. For example, a sheet having a pair of opposite edges $A_1$ and $A_2$, and a pair of opposite edges $B_1$ and $B_2$, may be provided at $A_1$ and $A_2$ with parallel running profiles 1 and 2 respectively, and may be deformed to be rendered heat-recoverable such that edge $B_1$ is greater in length than edge $B_2$ whereby edges $A_1$ and $A_2$ and corresponding profiles 1 and 2 are no longer parallel. This heat-recoverable closure article is capable of being positioned about a substrate and profiles 1 and 2 are capable of being inter-connected and capable of retention even though profiles 1 and 2 are not perpendicularly placed with respect to the principal direction of recovery of the sheet.

The sheet may be provided with a set of elongate profiles at each edge thereof and running parallel to the edge. This is particularly advantageous when the substrate to be covered has a large diameter, for example, 25 cm or more. A set of profiles may be stronger than a single profile and in some cases two small profiles may be less bulky than one. Of course, in this embodiment the article must comprise two support means and two fastening means, where these are required.

It may be advantageous to reinforce the areas of the sheet which are provided with the profiles by blending into the material of at least these areas a reinforcing filler, for example, glass bead, glass fibre or mica, or by coating these areas with a reinforcing material, for example, metal, glass, impregnated cloth or filled or unfilled plastic. It is preferable that the sheet may be coated with a mastic, hot melt adhesive or heat and/or pressure sensitive bonding agent and this coating may advantageously extend over the interconnectable faces of the profiles. The interconnectable faces of the profiles may alternatively be provided with a thermosetting adhesive compatible with the material of the profiles, for example, a thermosetting plastic, for example, epoxy resin.

The regions of the sheet provided with a profile may be of a material dissimilar to but mechanically stronger than the other regions of the sheet. This may be accomplished by increasing the cross-link density of the profiles or, for example, the material of and adjacent to each profile may comprise a strip of mechanically strong material which may be attached to an edge of the sheet. The profiles preferably extend from the same face of the sheet.

It will be understood that it is not necessary for satisfactory performance of the closure article according to the invention that the regions of the sheet provided with the profiles and/or the profiles be heat-recoverable.

The support means according to the invention, which is preferably of a similar length to that of the first profile, is preferably a rod of metal, heat resistant plastic or wood. It may be of the same cross-sectional configuration as the first profile or may be the same cross-sectional configuration as a portion only of the first profile, preferably as the wider portion thereof. The support means tends to prevent the first profile, if this is heat and/or pressure deformable, from deformation towards a flat cross-section under the forces associated with closure and recovery of the closure article. The support means may be bonded to the first profile or portion thereof or integral therewith, for example in the form of a thicker wall, as required.

The fastening device of the invention is of a configuration such that it may be located about the profiles when the second profile is located about the first profile and such that upon the application of heat to recover the sheet it tends to prevent substantial dislocation of said profiles.

The fastening device may be similar to that disclosed in U.S. Pat. No. 3,455,336 or that disclosed in DOS No. 2600647, each of which disclosures is incorporated herein by reference.

If the fastening device for use in the present invention is constructed in accordance with the U.S. patent, it may be a strip of material of generally C-shaped section and may have a plurality of notches along its length for increasing its flexibility. It especially may comprise a central portion for lying over the wider portion of the interconnected profiles and curved portions for extending around and under the wider portion of the second profile, the inner edges of the tips of the C-shaped section being of the second profile, the inner edges of the tips of the C-shaped section being separated by a distance greater than the narrower portion of the second profile. It may be of, for example, light gauge stainless steel, a glass fibre reinforced thermoset, or, in non-corrosive environments, aluminium.

The fastening means of DOS No. 2600647 in a preferred embodiment for use in the present invention may be a heat-recoverable article of open cross-section which is capable of being located about the profiles of the sheet and which, upon the application of heat, recovers to retain the profiles in abutment. It is preferably made of a recoverable plastics material but may advantageously be of a recoverable metallic material.

The fastening means may be dimensionally stable and metallic or of any strong, preferably non-corrodable material and generally similar to that disclosed in Ellis or it may be heat-recoverable and generally similar to that disclosed in Evans et al.

In one preferred embodiment the fastening means may be fabricated from a stainless steel pipe from which a longitudinal section has been cut, the cut edges of the pipe being smoothed by filing. The diameter is advantageously chosen to be slightly larger than that of the supporting member to prevent it slipping and from the fastening means through the cut-out section. Advantageously, the size of the section cut-out is such that the fastening means can be easily slid along the second profile.

The sheet of the present invention is advantageously provided on the surface which in use will be adjacent to a substrate with a sealant which may be, for example, a mastic or a hot melt adhesive. The sheet may be provided in its outer surface with thermochromic markings which indicate when the sheet has received sufficient heat to recover it and/or melt a meltable sealant satisfactorily.

When the profiles of the closure article have been interconnected, the closure article may have not only a tubular cross-section but alternatively a T-, X- or Y-shaped section.

The invention will now be described in greater detail by way of example only with reference to the accompanying drawings of which FIG. 1 is an isometric view of a closure article according to the invention:

Figure 1:
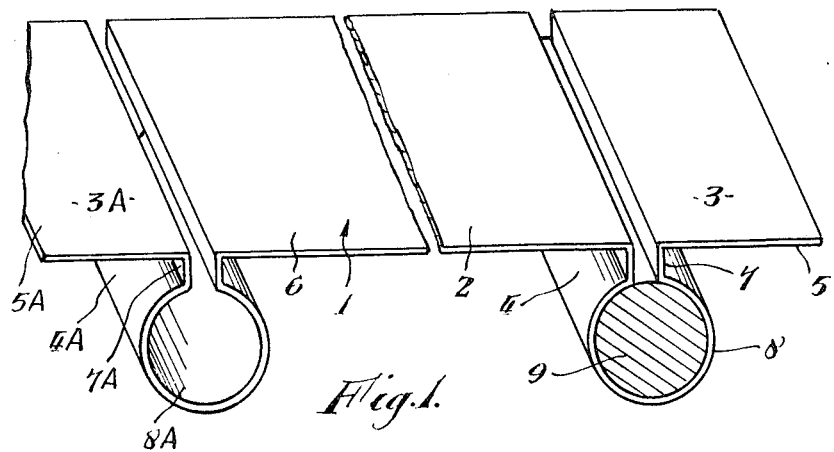

With reference to FIG. 1 there is shown a closure article indicated generally by reference numeral 1 comprising a sheet 2 having opposite edges 3 and 3A. Close to the edges of 3 and 3A the sheet is deformed to provide a first omega ($\Omega$)-like profile 4 and a second omega ($\Omega$)-like profile 4A. The profiles 4 and 4A are separated from the sheet edges 3 and 3A by sheet areas 5 and 5A respectively, profiles 4 and 4A being separated by a sheet area 6. The profiles 4 and 4A are similar and have narrow portions 7 and 7A with wider portions 8 and 8A respectively at the end of the narrow portions 7 and 7A remote from the plane of the sheet 2. The first profile 4 is provided with a supporting member 9. The principal direction of recovery of the closure article indicated generally by reference numeral 1 is parallel to a line joining sheet edges 3 and 3A.

Figure 2:
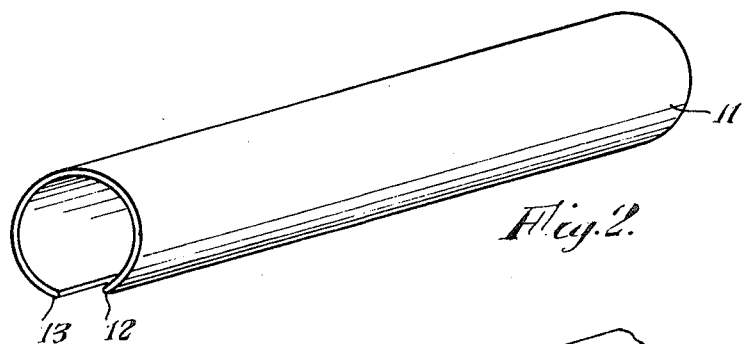
FIG. 2 is an isometric view of a fastening member according to the invention.

FIG. 2 shows a fastening means 11 comprising a circular pipe from which a longitudinal section has been removed, leaving opposed parallel faces 12 and 13.

Figure 3:
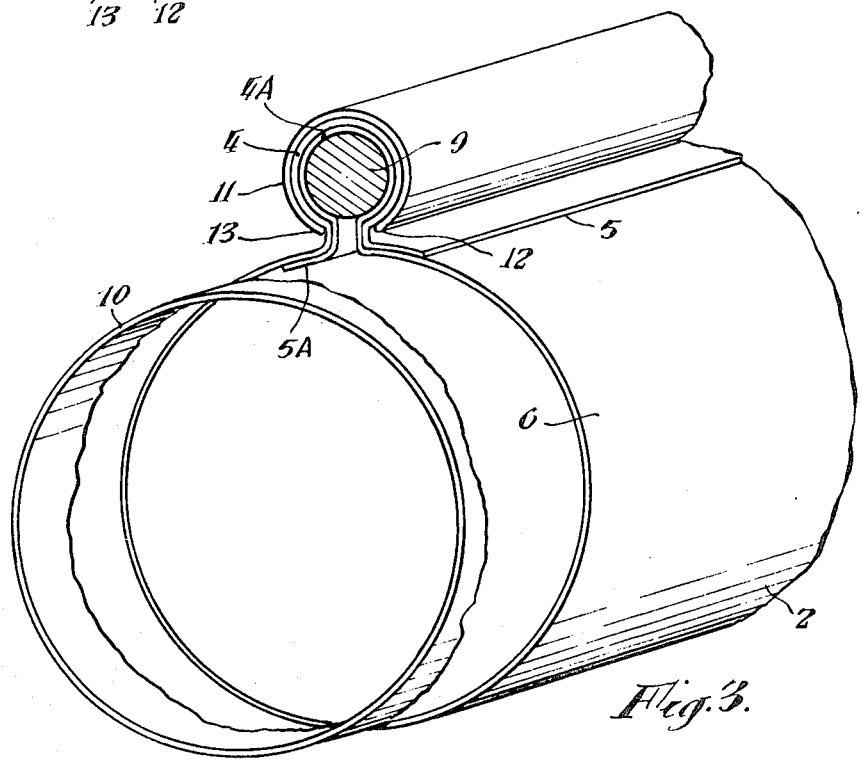
FIG. 3 is an isometric view of the article of FIG. 1 recovered about a substrate.

FIG. 3 shows the article of FIG. 1 positioned over and recovered about a substrate 10 with the fastening means of FIG. 2 in position over the profiles. The second profile 4A is located about the first profile 4 such that the narrow portion 7A lies adjacent to the narrow portion 7, the wider portion 8A lies adjacent to the wider portions 8 and the flat portion 5A lies adjacent to the sheet portion 6. The fastening means 11 is positioned over and about the second profile 4A prior to recovery of the heat-shrinkable sheet of the closure article.

On recovery of the sheet 6 any tendency of the profiles 4 and 4A to recovery towards the plane of the sheet is inhibited by the inter-action of the supporting member 9 and the faces 12 and 13 of the fastening means 11.

Figure 4:
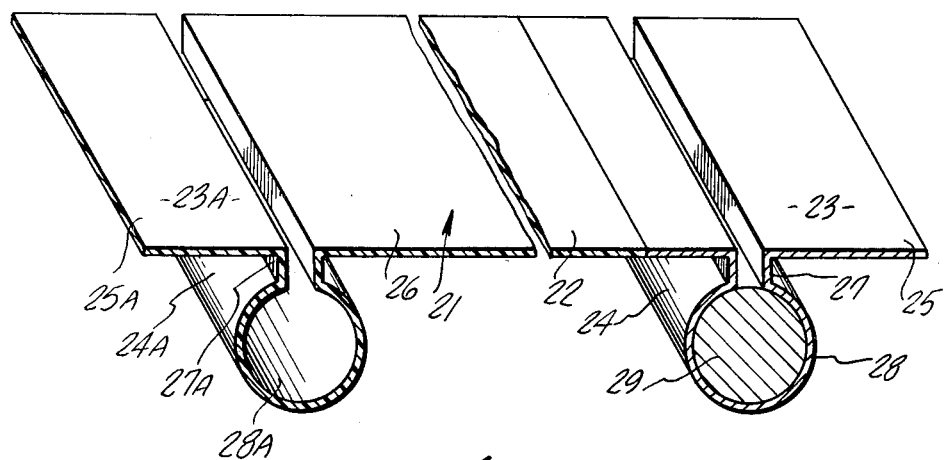

With reference to FIG. 4 there is shown a closure article indicated generally by reference numeral 21 comprising a sheet 22 having opposite edges 23 and 23A. Close to the edges of 23 and 23A the sheet is deformed to provide a first omega (Ω)-like profile 24 and a second omega (Ω)-like profile 24A. The profiles 24 and 24A are separated from the sheet edges 23 and 23A by sheet areas 25 and 25A respectively, profiles 24 and 24A being separated by a sheet area 26. Profile 24 is formed on a separate strip of material of, for example, metal attached to the remainder of the sheet. The profiles 24 and 24A are similar and have narrow portions 27 and 27A with wider portions 28 and 28A respectively at the end of the narrow portions 27 and 27A remote from the plane of the sheets 22. The first profile 24 is provided with a supporting member 29. The principal direction of recovery of the closure article indicated generally by reference numeral 21 is parallel to a line joining sheet edges 23 and 23A.

I claim:

1. A heat recoverable sheet having first and second profiles projecting from the same plane of the sheet, said profiles projecting substantially from only one surface of the sheet, said profiles being spaced apart, so that the second profile may be capable of frictionally engaging said first profile, said second profile having a concave surface that snaps over a convex surface of the first profile said profiles interlocking to form a hollow article capable of changing its cross-section upon recovery, said profiles remaining interlocked during recovery.

2. A heat recoverable sheet having first and second profiles projecting from the same plane of the sheet, said profiles projecting substantially from only one surface of the sheet, said profiles being spaced apart so that the second profile may be capable of frictionally engaging said first profile, said profiles engaging to form a hollow article capable of changing its cross-section upon recovery, said profiles remaining interlocking during recovery.

3. A sheet as claimed in claim 2, wherein said first profile has a first portion more remote from the plane of the sheet and a second portion closer to the plane of the sheet said first portion having a cross-section wider than said second portion, and said second profile has a portion of surface that is interlockable with at least a portion of the outer, projecting surface of the first profile.

4. A sheet as claimed in claim 3, wherein the shape of the cross-section of each profile is a horseshoe or together with the adjacent portions of the sheets forms an upper case omega.

5. A sheet as claimed in claim 2, wherein the sheet recovers to result in a reduction in the cross-section of the interior of the article.

6. A sheet as claimed in claim 5, wherein the sheet is closable to form a tube which shrinks in diameter.

7. A sheet as claimed in claim 2, wherein the sheet is a plastics material.

8. A sheet as claimed in claim 7, wherein the sheet is a crosslinked thermoplastic material.

9. A sheet as claimed in claim 7, wherein the plastics material is a polyolefin.

10. A sheet as claimed in claim 2, wherein the portions of the sheet containing the profiles are dimensionally heat-stable.

11. A sheet as claimed in claim 2, wherein at least one of the profiles is formed on a separate strip of material attached to the remainder of the sheet.

12. A sheet as claimed in claim 2, wherein at least one of said profiles is in the region of an edge of the sheet.

13. A sheet as claimed in claim 2, which also comprises one or more additional profiles, generally parallel to the first.

14. A sheet as claimed in claim 2, wherein the material of the profiles is reinforced.

15. A sheet as claimed in claim 2, wherein at least a portion of the sheet is coated with a material selected from mastics, hot melt adhesives and heat sensitive and pressure sensitive bonding agents.

16. A sheet as claimed in claim 15, wherein the coating extends to the portions of the profiles that will be interlocked.

17. A closure means comprising a sheet as claimed in claim 2 and a fastening means that surrounds at least a portion of said second profile, whereby the profiles are maintainable in interlocking relationship during recovery.

18. A closure means as claimed in claim 17 which also comprises an internal support means for said first profile.

19. A closure means as claimed in claim 18, wherein said support means is a rod.

20. A closure means as claimed in claim 17, wherein the fastening means is a strip having a generally C-shaped cross-section.

21. A closure means as claimed in claim 17, wherein the fastening means is heat recoverable to maintain the profiles in abutment.

22. A sheet according to claim 2 wherein profiles extend in a direction parallel to the line formed by the overlapping of the sheet edges to form a hollow article.

23. A closure means comprising a sheet as claimed in claim 2 wherein said first profile has an internal support means for maintaining said profile in an interlocking relationship during recovery of said sheet.

24. A closure means as claimed in claim 23, wherein said support means is a rod.

25. A sheet as claimed in claim 2 wherein said profiles are held in an interlocking relationship by a fastening means.

* * * * *